(12) United States Patent
Jiang et al.

(10) Patent No.: US 11,138,846 B2
(45) Date of Patent: Oct. 5, 2021

(54) METHOD AND APPARATUS FOR VIDEO PATROL

(71) Applicant: HANGZHOU HIKVISION SYSTEM TECHNOLOGY CO., LTD., Hangzhou (CN)

(72) Inventors: Haiyang Jiang, Hangzhou (CN); Shian Wang, Hangzhou (CN); Qilin Chen, Hangzhou (CN); Furong Lin, Hangzhou (CN)

(73) Assignee: HANGZHOU HIKVISION SYSTEM TECHNOLOGY CO., LTD., Hangzhou (CN)

( * ) Notice: Subject to any disclaimer, the term of this patent is extended or adjusted under 35 U.S.C. 154(b) by 28 days.

(21) Appl. No.: 16/465,839

(22) PCT Filed: Aug. 28, 2017

(86) PCT No.: PCT/CN2017/099333
§ 371 (c)(1),
(2) Date: May 31, 2019

(87) PCT Pub. No.: WO2018/076920
PCT Pub. Date: May 3, 2018

(65) Prior Publication Data
US 2019/0325720 A1 Oct. 24, 2019

(30) Foreign Application Priority Data
Oct. 31, 2016 (CN) .......................... 201610928500.0

(51) Int. Cl.
*G06F 3/00* (2006.01)
*G06F 16/00* (2019.01)
(Continued)

(52) U.S. Cl.
CPC . *G08B 13/19645* (2013.01); *G08B 13/19643* (2013.01); *G08B 13/19652* (2013.01); *G08B 13/19697* (2013.01)

(58) Field of Classification Search
CPC ........ G08B 13/19645; G08B 13/19643; G08B 13/19652; G08B 13/19697; G08B 13/196;
(Continued)

(56) References Cited

U.S. PATENT DOCUMENTS 4,225,881 A * 9/1980 Tovi ................. G08B 13/19619
348/151
4,745,479 A * 5/1988 Waehner ................ H04N 5/445
348/567

(Continued)

FOREIGN PATENT DOCUMENTS

CN 101126627 2/2008
CN 101141629 3/2008
(Continued)

OTHER PUBLICATIONS

Extended European Search Report issued in counterpart European Application No. 17865760.7, dated Oct. 9, 2019.
(Continued)

*Primary Examiner* — Philip P. Dang
(74) *Attorney, Agent, or Firm* — Norton Rose Fulbright US LLP (57) ABSTRACT

Disclosed is a video patrol method and apparatus. The number of alarm messages for each capture device is stored in a database. According to the number of alarm messages for each capture device, the weight corresponding to each capture device is determined. The greater the number of alarm messages for a capture device is, the greater the weight corresponding to the capture device is. The play duration corresponding to each capture device is determined
(Continued)

according to the weights. The greater the weight corresponding to a capture device is, the longer the duration for the capture device is. The play time period for each capture device is determined according to the determined play durations. The management device controls the video wall to perform video patrol according to the determined play time period for each capture device.

13 Claims, 2 Drawing Sheets

(51) Int. Cl.
  *G06F 12/00* (2006.01)
  *H04N 5/247* (2006.01)
  *G08B 13/196* (2006.01)
(58) Field of Classification Search
  CPC ...... G06F 3/1446; H04N 5/232; H04N 7/181; H04N 7/18; H04L 41/04; H04L 41/06
  See application file for complete search history.

(56) References Cited

U.S. PATENT DOCUMENTS

| | | | | |
|---|---|---|---|---|
| 5,909,548 | A * | 6/1999 | Klein | G06F 16/40 709/217 |
| 6,583,730 | B2 * | 6/2003 | Lang | B60R 1/00 340/901 |
| 6,597,389 | B2 * | 7/2003 | Tanaka | H04N 5/23203 348/14.08 |
| 6,970,183 | B1 * | 11/2005 | Monroe | G08B 7/062 348/143 |
| 7,071,971 | B2 * | 7/2006 | Elberbaum | H04N 5/2253 348/143 |
| 7,262,791 | B2 * | 8/2007 | Kohno | H04N 7/181 348/153 |
| 7,327,387 | B2 * | 2/2008 | Tanaka | H04N 1/00137 348/207.99 |
| 7,346,196 | B2 * | 3/2008 | Gin | G06K 9/00221 348/151 |
| 7,369,907 | B2 * | 5/2008 | Hibino | G06F 1/1671 700/94 |
| 7,476,828 | B2 * | 1/2009 | Genua | H05B 6/6435 219/678 |
| 7,667,596 | B2 * | 2/2010 | Ozdemir | G08B 31/00 340/541 |
| 7,726,890 | B2 * | 6/2010 | Misawa | G03B 17/02 396/529 |
| 7,738,011 | B2 * | 6/2010 | Ito | H04N 5/23206 348/211.11 |
| 7,825,792 | B2 * | 11/2010 | Buehler | G08B 13/19697 340/506 |
| 8,013,729 | B2 * | 9/2011 | Buehler | G08B 13/19671 340/506 |
| 8,169,482 | B2 * | 5/2012 | Kajita | G08B 13/19676 348/159 |
| 8,323,107 | B2 * | 12/2012 | Amit | A63B 61/00 463/35 |
| 8,370,421 | B2 * | 2/2013 | Gennari | H04L 67/12 709/202 |
| 9,057,609 | B2 * | 6/2015 | Yu | G01C 11/00 |
| 9,503,731 | B2 * | 11/2016 | Okazaki | H04N 19/16 |
| 9,597,016 | B2 * | 3/2017 | Stone | G06T 7/215 |
| 9,881,216 | B2 * | 1/2018 | Buehler | G08B 13/19608 |
| 10,192,415 | B2 * | 1/2019 | Heitz, III | G08B 13/19656 |
| 10,229,402 | B2 * | 3/2019 | Leggo | G06Q 20/204 |
| 10,235,428 | B2 * | 3/2019 | Varadarajan | G10L 25/54 |
| 2004/0022516 | A1 | 2/2004 | Yamashiro et al. | |
| 2005/0128298 | A1 | 6/2005 | Rottmann | |
| 2006/0248027 | A1 * | 11/2006 | Tedesco | G08B 13/196 706/14 |
| 2007/0282665 | A1 * | 12/2007 | Buehler | G06Q 30/0201 705/7.29 |
| 2008/0136628 | A1 | 6/2008 | Ishii | |
| 2011/0169952 | A1 * | 7/2011 | Yamaguchi | H04N 19/164 348/143 |
| 2013/0080218 | A1 * | 3/2013 | Wildern, IV | G06F 16/9554 705/14.1 |
| 2013/0218688 | A1 * | 8/2013 | Roos | G06F 3/0482 705/14.69 |
| 2016/0082839 | A1 * | 3/2016 | Ricci | G06F 16/252 701/36 |
| 2016/0266861 | A1 | 9/2016 | Kim | |
| 2017/0164016 | A1 * | 6/2017 | Yang | H04N 21/2187 |

FOREIGN PATENT DOCUMENTS

| | | |
|---|---|---|
| CN | 101146216 | 3/2008 |
| CN | 101500152 | 8/2009 |
| CN | 101783744 | 7/2010 |
| CN | 201689547 | 12/2010 |
| CN | 102422237 | 4/2012 |
| CN | 102984453 | 3/2013 |
| CN | 103338349 | 10/2013 |
| CN | 104349140 | 2/2015 |
| CN | 104574243 | 4/2015 |
| CN | 105554471 | 5/2016 |
| CN | 205336437 | 6/2016 |

OTHER PUBLICATIONS

Office Action issued in counterpart Chinese Application No. 201610928500.0, dated Nov. 12, 2019 (English Translation provided).

Office Action issued in corresponding Chinese Application No. 201610928500.0, dated Mar. 2, 2020, 7 pages (English translation unavailable).

International Search Report and Written Opinion issued in Corresponding International Patent Application No. PCT/CN2017/099333, dated Nov. 15, 2017 (English Translation).

Notification to Grant Patent Right for Invention issued in Corresponding Chinese Application No. 201610928500.0, dated May 29, 2020 (English Translation provided).

* cited by examiner

METHOD AND APPARATUS FOR VIDEO PATROL

CROSS-REFERENCE TO RELATED APPLICATIONS

The present application is a national phase under 35 U.S.C. § 371 of International Application No. PCT/CN2017/099333, filed Aug. 28, 2017, which claims priority to Chinese patent application No. 201610928500.0 filed with China National Intellectual Property Administration on Oct. 31, 2016 and entitled "Method and Apparatus for Video Patrol", each of which are incorporated herein by reference in their entirety.

TECHNICAL FIELD

The present application relates to the field of video surveillance technology, and in particular, to a video patrol method and apparatus.

BACKGROUND

In the field of video surveillance technology, video patrol systems have been widely used. A video patrol system typically includes a capture device, a video wall, and a management device. The management device controls the video wall to perform video patrol according to a patrol plan, that is, controls the video wall to play a video captured by a specified capture device at a specified position in the video wall within a specified time period.

The existing video patrol simply plays a video captured by each capture device in sequence, and cannot pay close attention to key areas.

SUMMARY

An object of the embodiments of the present application is to provide a video patrol method and apparatus, to pay close attention to key areas.

To achieve the above object, an embodiment of the present application provides a video patrol method, which is applicable to a management device in a video patrol system. The method includes:

determining a weight corresponding to each capture device managed by the management device according to the number of alarm messages for each capture device stored in a database, wherein the larger the number of alarm messages for a capture device is, the greater a weight corresponding to the capture device is;

determining, according to the weights, a play duration corresponding to each capture device, wherein the greater a weight of a capture device is, the longer a play duration of the capture device is; and determining, according to the determined play durations, a play time period for each capture device.

Optionally, storing the number of alarm messages for a capture device in the database may include:

receiving an alarm message, and determining a target area in which the alarm message is located; and determining a target capture device in the target area, and updating the number of alarm messages for the target capture device in the database.

Optionally, the method may further include:

determining a target moment corresponding to each capture device according to a first identifier of a capture device and an alarm moment corresponding to each alarm message stored in the database;

the step of determining, according to the determined play durations, a play time period for each capture device includes:

determining a play time period for each capture device according to the play duration and the target moment corresponding to this capture device.

Optionally, storing a first identifier of a capture device and an alarm moment corresponding to an alarm message in the database may include:

receiving an alarm message, and determining a target area in which the alarm message is located and an alarm moment corresponding to the alarm message; and determining a target capture device in the target area, and storing the alarm moment corresponding to the alarm message and the first identifier of the target capture device in the database.

Optionally, determining a target area in which the alarm message is located may include:

determining a location of the alarm message in a map; and determining a target area in which the location is located according to pre-divided areas in the map.

Optionally, the map is an electronic map being displayed, and the method further may include:

determining a first capture device corresponding to a video being played;

determining a first location of the first capture device in the map; and increasing the display brightness of the first location, or making a mark on the first location and displaying the mark.

Optionally, the database further stores the number of alarm messages for each preset point of each capture device;

the step of determining a weight corresponding to each capture device managed by the management device may include:

determining a weight corresponding to each preset point of each capture device managed by the management device;

the step of determining, according to the weights, a play duration corresponding to each capture device includes:

determining, according to the weight corresponding to each preset point, a play duration corresponding to this preset point; and the step of determining, according to the determined play durations, a play time period for each capture device includes:

determining, according to the play duration corresponding to each preset point, a play time period for this preset point.

Optionally, the method may further include:

receiving a first switching instruction, wherein the first switching instruction contains a first identifier of a to-be-switched capture device and a second identifier of a to-be-switched preset point of the to-be-switched capture device;

sending, according to the first identifier of the to-be-switched capture device, a second switching instruction to the to-be-switched capture device, wherein the second switching instruction contains the second identifier of the to-be-switched preset point, so that the to-be-switched capture device switches a current preset point thereof to the to-be-switched preset point.

Optionally, the method may further include:

receiving a first patrol plan sent by a user, wherein the first patrol plan includes the play time period for each capture device; and controlling a video wall in the system to perform video patrol according to the first patrol plan.

To achieve the above object, an embodiment of the present application provides a video patrol apparatus, which is applicable to a management device in a video patrol system. The apparatus includes:

a first determining module, configured for determining a weight corresponding to each capture device managed by the management device according to the number of alarm messages for each capture device stored in a database, wherein the larger the number of alarm messages for a capture device is, the greater a weight corresponding to the capture device is;

a second determining module, configured for determining, according to the weights, a play duration corresponding to each capture device, wherein the greater a weight of a capture device is, the longer a play duration of the capture device is; and a third determining module, configured for determining, according to the determined play durations, a play time period for each capture device.

Optionally, the apparatus may further include:

a first receiving and determining module, configured for receiving an alarm message, and determining a target area in which the alarm message is located; and an updating module, configured for determining a target capture device in the target area, and updating the number of alarm messages for the target capture device in the database.

Optionally, the apparatus may further include:

a fourth determining module, configured for determining a target moment corresponding to each capture device according to a first identifier of a capture device and an alarm moment corresponding to each alarm message stored in the database; and the third determining module is configured for:

determining a play time period for each capture device according to the play duration and the target moment corresponding to this capture device.

Optionally, the apparatus may further include:

a second receiving and determining module, configured for receiving an alarm message, and determining a target area in which the alarm message is located and an alarm moment corresponding to the alarm message; and a storing module, configured for determining a target capture device in the target area, and storing the alarm moment corresponding to the alarm message and the first identifier of the target capture device in the database.

Optionally, the second receiving module is configured for:

receiving an alarm message and determining a location of the alarm message in a map; and determining a target area in which the location is located according to pre-divided areas in the map.

Optionally, the map is an electronic map being displayed, and the apparatus further may include:

a first determining module, configured for determining a first capture device corresponding to a video being played;

a six determining module, configured for determining a first location of the first capture device in the map; and a processing module, configured for increasing the display brightness of the first location, or making a mark on the first location and displaying the mark.

Optionally, the database further stores the number of alarm messages for each preset point of each capture device;

the first determining module is configured for:

determining a weight corresponding to each preset point of each capture device managed by the management device according to the number of alarm messages for each preset point of each capture device stored in the database;

the second determining module is configured for:

determining, according to the weight corresponding to each preset point, a play duration corresponding to this preset point;

the third determining module is configured for:

determining, according to the play duration corresponding to each preset point, a play time period for this preset point.

Optionally, the apparatus may further include:

a first receiving module, configured for receiving a first switching instruction, wherein the first switching instruction contains a first identifier of a to-be-switched capture device and a second identifier of a to-be-switched preset point of the to-be-switched capture device;

a sending module, configured for sending, according to the first identifier of the to-be-switched capture device, a second switching instruction to the to-be-switched capture device, wherein the second switching instruction contains the second identifier of the to-be-switched preset point, so that the to-be-switched capture device switches a current preset point thereof to the to-be-switched preset point.

Optionally, the apparatus may further include:

a second receiving module, configured for receiving a first patrol plan sent by a user, wherein the first patrol plan includes the play time period for each capture device; and a controlling module, configured for controlling a video wall in the system to perform video patrol according to the first patrol plan.

In order to achieve the above object, an embodiment of the present application further provides an electronic device, including a processor, a communication interface, a memory, and a communication bus. The processor, the communication interface and the memory communicate with each other through the communication bus. The memory is configured to store a computer program. The processor is configured to perform the above video patrol method when executing the program stored in the memory.

To achieve the above object, an embodiment of the present application further provides an executable program code for performing the above video patrol method when being executed.

To achieve the above object, an embodiment of the present application further provides a storage medium for storing an executable program code, wherein the executable program code is configured to perform the above video patrol method when being executed.

In the embodiments in the present application, the number of alarm messages for each capture device is stored in the database. The greater the number of alarm messages for a capture device is, the more this capture device is worthy of attention. Therefore, according to the number of alarm messages for each capture device, the weight corresponding to each capture device is determined. The greater the number of alarm messages for a capture device is, the greater the weight corresponding to the capture device is. The play duration corresponding to each capture device is determined according to the weights. The greater the weight corresponding to a capture device is, the longer the duration for the capture device is. The play time period for each capture device is determined according to the determined play durations. The management device controls the video wall to perform video patrol according to the determined play time period for each capture device. It can be seen that with this solution, the video captured by the capture device that is worthy of attention is played on the video wall for a longer duration, thereby paying close attention to key areas.

Of course, it is not necessary to achieve all of the advantages described above in any of the products or methods of the present application at the same time.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION OF THE INVENTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

In order to solve the above technical problem, an embodiment of the present application provides a video patrol method and apparatus, which can be applied to a management device in a video patrol system. The video patrol method according to the embodiment of the present application is first described in detail below.

Figure 1:
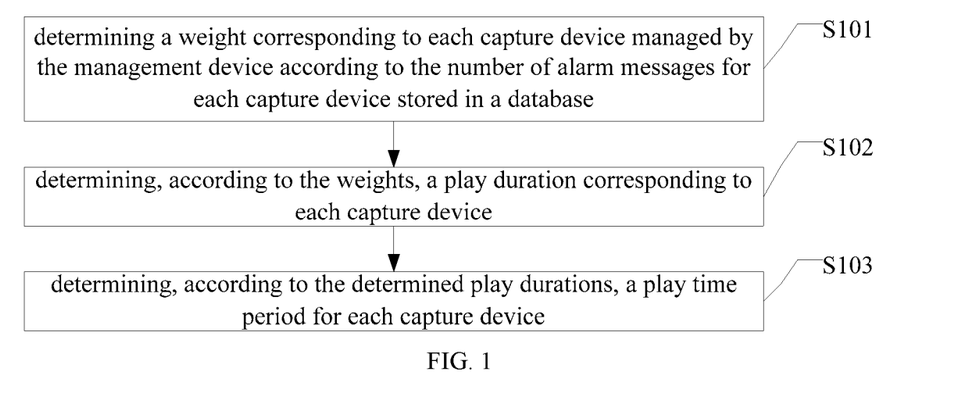
FIG. 1 is a flowchart of a video patrol method according to an embodiment of the present application.

FIG. 1 is a schematic flowchart of a video patrol method according to an embodiment of the present disclosure. The method includes S101-S103.

S101: determining a weight corresponding to each capture device that is managed by a management device according to the number of alarm messages for each capture device stored in a database. The larger the number of alarm messages for a capture device is, the greater the weight corresponding to the capture device is.

In this embodiment, when an abnormal situation appears in an image captured by a capture device, such as robbery, traffic accident, fire, etc., the capture device or the management device managing the capture device may store an alarm message for the capture device in the database.

The database may be disposed in the management device, or may be disposed separately. This is not limited herein.

Specifically, the process of storing the number of alarm messages for a capture device in the database may include:

receiving an alarm message, and determining a target area where the alarm message is located; and determining a target capture device in the target area, and updating the number of alarm messages for the target capture device in the database.

For example, the video patrol system includes one management device and four capture devices. There is only one display area on the video wall. The videos captured by the four capture devices is patrolled on this display area for 10 hours every day.

The four capture devices includes capture device 1, capture device 2, capture device 3, and capture device 4. The capture device 1 is disposed at position A, the capture device 2 is disposed at position B, the capture device 3 is disposed at position C and the capture device 4 is disposed at position D. The position A is located in an area W, the position B is located in an area X, the position C is located in an area Y, and the position D is located in an area Z.

It should be noted that, in this embodiment, the areas may be divided based on geographical locations, administrative areas, the distribution of the capture devices, and so on, which is not limited herein.

Four alarm messages for the capture device 1, five alarm messages for the capture device 2, two alarm messages for the capture device 3, and three alarm messages for the capture device 4 are stored in the database.

In this case, the management device receives an alarm message sent by the capture device 2 and determines that the target area where the alarm message is located is the area X. There is only one target capture device in the area X, which is the capture device 2. The management device updates the number of alarm messages for the capture device 2 stored in the database to 6.

It should be noted that in actual application, there may be many capture devices, and a plurality of capture devices may be disposed in each area. Furthermore, there may be one or more display areas in the video wall. The above example is only described based on a simplest application scenario.

The greater the number of alarm messages for a capture device is, the greater the weight corresponding to the capture device is. Herein, the weight corresponding to the capture device 1 is 30%, the weight corresponding to the capture device 2 is 40%, the weight corresponding to the capture device 3 is 10%, and the weight corresponding to the capture device 4 is 20%.

S102: determining, according to the weights, a play duration corresponding to each capture device; wherein, the greater a weight corresponding to a capture device is, the longer a play duration corresponding to the capture device is.

As mentioned above, there is only one display area on the video wall of the system, and the videos captured by the four capture devices is patrolled on the display area for 10 hours every day. In other words, the 10 hours can be divided for the four capture devices according to their weights. In this way, the play duration corresponding to the capture device 1 is 3 hours, the play duration corresponding to the capture device 2 is 4 hours, the play duration corresponding to the capture device 3 is 1 hour, and the play duration corresponding to the capture device 4 is 2 hours.

S103: determining, according to the determined play durations, a play time period for each capture device.

In an implementation, the four capture devices may be randomly sorted, and the videos captured by the four capture devices are sequentially played according to the sorted result.

Assume that the sorted result is the capture device 3, the capture device 1, the capture device 4, and the capture device 2. Then, in the 10 hours of the video patrol, the video captured by the capture device 3 is played for the first hour; the video captured by the capture device 1 is played for the next 3 hours; the video captured by the capture device 4 is played for the next 2 hours; and the video captured by the capture device 2 is played for the last 4 hours.

The video to be played can also be switched once every hour within the 10 hours of the video patrol, and the total duration of playing the video captured by each capture device is equal to the play duration corresponding to this capture device. That is to say, the video captured by the capture device 3 may be played for the first hour; the video captured by the capture device 1 may be played for the second hour; the video captured by the capture device 4 may be played for the third hour; the video captured by the capture device 2 may be played for the fourth hour; the video captured by the capture device 1 may be played for the fifth hour; the video captured by the capture device 4 may be played for the sixth hour; the video captured by the capture device 2 may be played for the seventh hour; the video captured by the capture device 1 may be played for the eighth hour; the video captured by the capture device 2 may be played for the ninth hour; and the video captured by the capture device 2 may be played for the tenth hour.

In an implementation, a target moment corresponding to each capture device may be determined according to a first identifier of a capture device and an alarm moment corresponding to each alarm message stored in the database. A play time period for each capture device is determined according to the play duration and target moment corresponding to each capture device.

The first identifier is an identifier of the capture device. In the embodiments shown in the present application, the identifier of the capture device is referred to as a first identifier, and an identifier of a preset point hereafter is referred to as a second identifier. The first identifier may be a name, an ID number, an IP address or the like of the capture device. It is assumed here that the first identifier is the sequence number of the capture device (capture device 1, capture device 2, capture device 3, capture device 4, and the like).

In this embodiment, the process of storing the first identifier of the capture device and the alarm moment corresponding to the alarm message in the database may include:

receiving an alarm message, and determining a target area where the alarm message is located and an alarming moment corresponding to the alarm message; and determining a target capture device in the target area, and storing the alarming moment corresponding to the alarm message and the first identifier of the target capture device in the database.

That is to say, when an abnormal situation appears in the image captured by the capture device, the capture device or the management device managing the capture device stores not only the alarm message for the capture device but also the alarm moment corresponding to the alarm message in the database.

Based on above example, the number of alarm messages for the capture device 1 stored in the database is 4, and alarm moments corresponding to the alarm messages are: 9:03, 8:57, 9:15, 10:10. The number of alarm messages for the capture device 2 stored in the database is 5, and alarm moments corresponding to the alarm messages are: 11:05, 10:54, 11:10, 11:20. The number of alarm messages for the capture device 3 is 2, and alarm moments corresponding to the alarm messages are: 13:05, 13:10. The number of alarm messages for the capture device 4 is 3, and alarm moments corresponding to the alarm messages are: 15:07, 15:15, 15:20.

In this case, the management device receives an alarm message sent by the capture device 2 and determines that the target area where the alarm message is located is the area X, and the alarm moment corresponding to the alarm message is 12:10. There is only one target capture device in the area X, which is the capture device 2. The management device updates the number of alarm messages for the capture device 2 stored in the database to 6, and stores the alarm moment 11:15 corresponding to the capture device 2.

It can be understood that the alarm moment can reflect a time period in which an abnormal situation is prone to appear in an image captured by a capture device, and the capture device should be focused on before and after the alarm moment. Therefore, the target moment corresponding to the capture device is determined, and the target moment should reflect the alarm moment stored in the database as much as possible.

For example, the alarm moments for the capture device 1 are: 9:03, 8:57, 9:15, 10:10, respectively. Any of these alarm moments may be determined as the target moment, and an intermediate moment of a time period formed by these alarm moments may also be used as the target moment. Of course, the target moment may also be determined in other ways, which are not enumerated here. Here, it is assumed that the target moment corresponding to the capture device 1 is determined to be 10:00. Similarly, it is assumed that the target moment corresponding to the capture device 2 is 11:00, the target moment corresponding to the capture device 3 is 13:00, and the target moment corresponding to the capture device 4 is 15:00.

The videos captured by the four capture devices may be patrolled in above manner in which the video to be played is switched once every hour and the total play duration of the video captured by each capture device is equal to the play duration corresponding to the capture device. In addition, the video captured by the capture device 1 is played for one hour corresponding to 10:00. The video captured by the capture device 2 is played for one hour corresponding to 11:00. The video captured by the capture device 3 is played for one hour corresponding to 13:00. The video captured by the capture device 4 is played for one hour corresponding to 15:00.

It should be noted that the number of alarm messages stored in the database is constantly changing, that is, whether the capture device is worthy of attention is also constantly changing. Therefore, the method can be performed once every preset time period to re-determine the play time period of each capture device to ensure that the video patrol scheme is adjusted according to actual conditions.

In the embodiment of FIG. 1 in the present application, the number of alarm messages for each capture device is stored in the database. The greater the number of alarm messages for a capture device is, the more this capture device is worthy of attention. Therefore, according to the number of alarm messages for each capture device, the weight corresponding to each capture device is determined. The greater the number of alarm messages for a capture device is, the greater the weight corresponding to the capture device is. The play duration corresponding to each capture device is determined according to the weights. The greater the weight corresponding to a capture device is, the longer the duration for the capture device is. The play time period for each capture device is determined according to the determined play durations. The management device controls the video wall to perform video patrol according to the determined play time period for each capture device. It can be seen that with this solution, the video captured by the capture device that is worthy of attention is played on the video wall for a longer duration, thereby paying close attention to key areas.

In an implementation of the present application, in order to determine a target area where the alarm message is located, the location of the alarm message in the map may be determined. The target area in which the location is located is determined according to pre-divided areas in the map.

Specifically, the map may be an electronic map being displayed. A first capture device corresponding to a video being played may be determined. A first location of the first capture device in the map is determined. The display brightness of the first location is increased, or a mark is made on the first location and the mark is displayed.

In this way, the location of the video being played in the video wall can be displayed in the map directly, so as to achieve better effect.

In an implementation of the present application, the database may also store the number of alarm messages corresponding to each preset point of each capture device.

In determining the weights of the respective capture devices managed by the management device, the management device determines the weight corresponding to each preset point of each capture device managed by itself, determines the play duration corresponding to each preset point according to the weight corresponding to this preset point, and determines the play time period for each preset point according to the play duration corresponding to this preset point.

It can be understood that the existing capture device can capture images of different areas by adjusting its capturing angle. For example, for a dome camera, each dome camera can has multiple preset points. At each preset point, the dome camera captures images at different angles. As a simple example, the preset points of a dome camera may be set to be four. At these preset points, the dome camera can capture images in east, south, west, and north directions, respectively.

Therefore, the number of alarm messages for each preset point of each capture device can be stored in the database. A capture device at each preset point thereof is taken as an independent capture device, and the above method is used for each preset point.

In this embodiment, the management device may receive a first switching instruction. The first switching instruction includes a first identifier of a to-be-switched capture device and a second identifier of a to-be-switched preset point of the to-be-switched capture device.

According to the first identifier of the to-be-switched capture device, a second switching instruction is sent to the to-be-switched capture device. The second switching instruction includes the second identifier of the to-be-switched preset point, so that the to-be-switched capture device switches its current preset point to the to-be-switched preset point.

In this embodiment, the identifier of the preset point is referred to as a second identifier. The second identifier may be a name, an ID number, an orientation information, or the like of the preset point. It is assumed here that the second identifier is capturing angle information of the preset point ("East", "West", "South", "North", etc.).

That is, a user can adjust the preset point of the capture device. For example, the management device receives the first switching instruction sent by the user. The information carried in the first switching instruction includes: the to-be-switched capture device being the capture device 1, and the capturing angle information of the to-be-switched preset point being "East". Then the management device sends a second switching instruction to the capture device 1. The information carried in the second switching instruction is the capturing angle information of the to-be-switched preset point being "East". After receiving the second switching instruction, the capture device 1 adjusts its current preset point to the preset point for capturing images in the direction of "east".

In an implementation of the present application, a first patrol plan sent by a user may be received. The first patrol plan includes a play time period for each capture device. The video patrol is performed on the video wall in the system according to the first patrol plan.

In the foregoing implementation, the management device can determine the play time periods corresponding to all capture devices in the video patrol system, and use the determined play time periods corresponding to all capture devices as a patrol plan. The management device executes the patrol plan, that is, the management device controls the video wall in the system to perform video patrol according to the patrol plan.

Assuming that the management device receives a first patrol plan sent by the user, which includes a play time period for each capture device. In this case, the management device stops executing the patrol plan, and starts executing the first patrol plan. That is, the management device controls the video wall in the system to perform video patrol according to the first patrol plan.

Corresponding to the above method embodiment, an embodiment of the present application further provides a video patrol apparatus.

Figure 2:
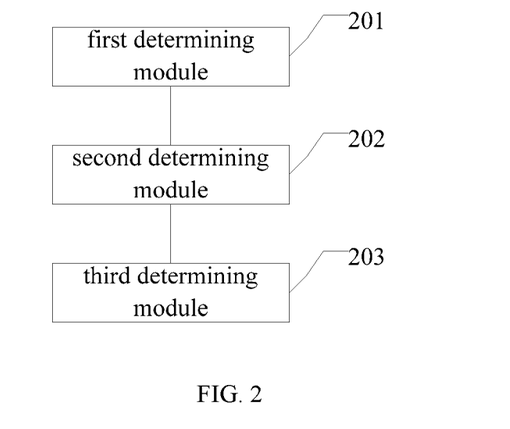
FIG. 2 is a schematic structural diagram of a video patrol apparatus according to an embodiment of the present application.

FIG. 2 is a schematic structural diagram of a video patrol apparatus according to an embodiment of the present application, including:

a first determining module 201, configured for determining a weight corresponding to each capture device managed by the management device according to the number of alarm messages for each capture device stored in a database, wherein the larger the number of alarm messages for a capture device is, the greater a weight corresponding to the capture device is;

a second determining module 202, configured for determining, according to the weights, a play duration corresponding to each capture device, wherein the greater a weight corresponding to a capture device is, the longer a play duration of the capture device is; and a third determining module 203, configured for determining, according to the determined play durations, a play time period for each capture device.

In this embodiment, the apparatus may further include a first receiving and determining module and an update module (not shown in the figure).

The first receiving and determining module is configured for receiving an alarm message, and determining a target area in which the alarm message is located.

The updating module is configured for determining a target capture device in the target area, and updating the number of alarm messages for the target capture device in the database.

In this embodiment, the apparatus may further include:

a fourth determining module (not shown in the figure), configured for determining a target moment corresponding to each capture device according to a first identifier of a capture device and an alarm moment corresponding to each alarm message stored in the database.

The third determining module 203 may be specifically configured for:

determining a play time period for each capture device according to the play duration and the target moment corresponding to this capture device.

In this embodiment, the apparatus may further include a second receiving and determining module and a storing module (not shown in the figure).

The second receiving and determining module is configured for receiving an alarm message, and determining a target area in which the alarm message is located and an alarm moment corresponding to the alarm message.

The storing module is configured for determining a target capture device in the target area, and storing the alarm moment corresponding to the alarm message and the first identifier of the target capture device in the database.

In this embodiment, the second receiving and determining module may be specifically configured for:

receiving an alarm message and determining a location of the alarm message in a map; and determining a target area in which the location is located according to pre-divided areas in the map.

In this embodiment, the map is an electronic map being displayed, and the apparatus may further include a first determining module, a six determining module and a processing module (not shown in the figure).

The first determining module is configured for determining a first capture device corresponding to a video being played.

The six determining module is configured for determining a first location of the first capture device in the map.

The processing module is configured for increasing the display brightness of the first location, or making a mark on the first location and displaying the mark.

In this embodiment, the database further stores the number of alarm messages for each preset point of each capture device.

The first determining module 201 may be configured for:

determining a weight corresponding to each preset point of each capture device managed by the management device according to the number of alarm messages for each preset point of each capture device stored in the database.

The second determining module 202 may be specifically configured for:

determining, according to the weight corresponding to each preset point, a play duration corresponding to this preset point.

The third determining module 203 may be specifically configured for:

determining, according to the play duration corresponding to each preset point, a play time period for this preset point.

In this embodiment, the apparatus may further include a first receiving module and a sending module (not shown in the figure).

The first receiving module is configured for receiving a first switching instruction, wherein the first switching instruction contains a first identifier of a to-be-switched capture device and a second identifier of a to-be-switched preset point of the to-be-switched capture device.

The sending module is configured for sending, according to the first identifier of the to-be-switched capture device, a second switching instruction to the to-be-switched capture device, wherein the second switching instruction contains the second identifier of the to-be-switched preset point, so that the to-be-switched capture device switches a current preset point thereof to the to-be-switched preset point.

In this embodiment, the apparatus may further include a second receiving module and a controlling module (not shown in the figure).

The second receiving module is configured for receiving a first patrol plan sent by a user, wherein the first patrol plan includes the play time period for each capture device.

The controlling module is configured for controlling a video wall in the system to perform video patrol according to the first patrol plan.

In the embodiment of FIG. 2 in the present application, the number of alarm messages for each capture device is stored in the database. The greater the number of alarm messages for a capture device is, the more this capture device is worthy of attention. Therefore, according to the number of alarm messages for each capture device, the weight corresponding to each capture device is determined. The greater the number of alarm messages for a capture device is, the greater the weight corresponding to the capture device is. The play duration corresponding to each capture device is determined according to the weights. The greater the weight corresponding to a capture device is, the longer the duration for the capture device is. The play time period for each capture device is determined according to the determined play durations. The management device controls the video wall to perform video patrol according to the determined play time period for each capture device. It can be seen that with this solution, the video captured by the capture device that is worthy of attention is played on the video wall for a longer duration, thereby paying close attention to key areas.

Figure 3:
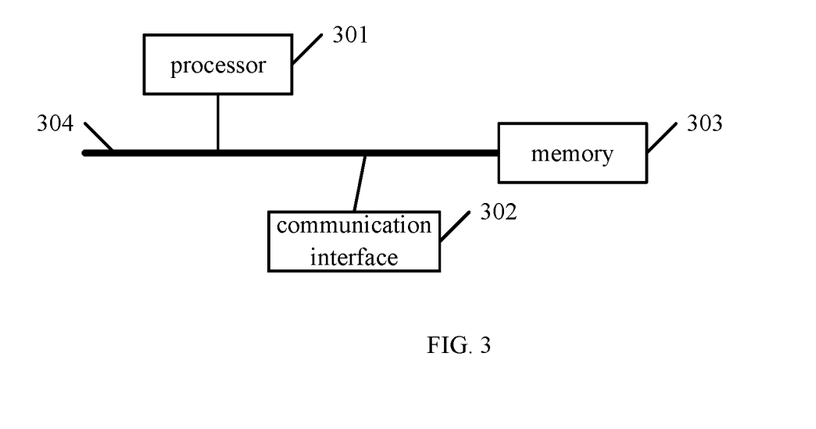
FIG. 3 is schematic structural diagram of an electronic device according to an embodiment of the present application.
Figure 4:
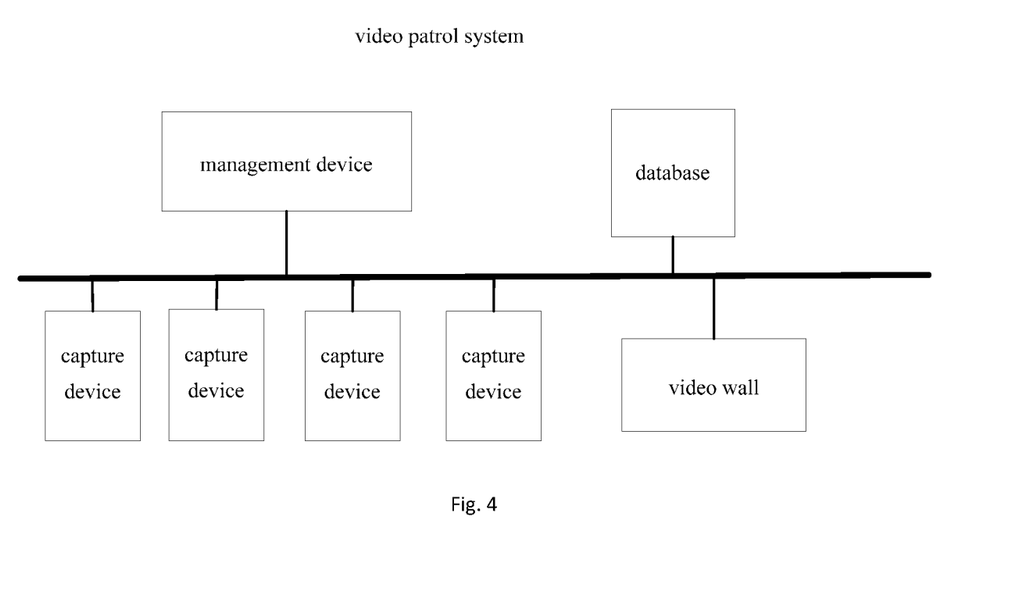
FIG. 4 is a schematic of a video patrol system according to an embodiment of the present invention.

An embodiment of the present application further provides an electronic device. As shown in FIG. 3, the device includes a processor 301, a communication interface 302, a memory 303, and a communication bus 304. The processor 301, the communication interface 302, and the memory 303 communicate with each other via the communication bus 304.

The memory 303 is configured to store a computer program.

The processor 301 is configured to perform the video patrol method when executing the program stored on the memory 303. The method includes:

determining a weight corresponding to each capture device managed by the management device according to the number of alarm messages for each capture device stored in a database, wherein the larger the number of alarm messages for a capture device is, the greater a weight corresponding to the capture device is;

determining, according to the weights, a play duration corresponding to each capture device, wherein the greater a weight corresponding to a capture device is, the longer a play duration of the capture device is; and determining, according to the determined play durations, a play time period for each capture device.

The electronic device may be a management device or the like in the video patrol system, which is not specifically limited.

The communication bus mentioned in the above electronic device may be a Peripheral Component Interconnect (PCI) bus or an Extended Industry Standard Architecture (EISA) bus. The communication bus can be divided into an address bus, a data bus, a control bus, and the like. For the convenience of representation, only one thick line is shown in the figure, but it does not mean that there is only one bus or one type of bus.

The communication interface is used for communication between the above electronic device and other devices.

The memory may include a random access memory (RAM), and may also include a non-volatile memory (NVM), such as at least one disk storage. Optionally, the memory may also be at least one storage device located away from the aforementioned processor.

The above processor may be a general-purpose processor, including a Central Processing Unit (CPU), a Network Processor (NP), etc.; or may be a Digital Signal Processing (DSP), Application Specific Integrated Circuit (ASIC), Field-Programmable Gate Array (FPGA) or other programmable logic device, discrete gate or transistor logic device, discrete hardware component.

In the embodiment of FIG. 3 in the present application, the number of alarm messages for each capture device is stored in the database. The greater the number of alarm messages for a capture device is, the more this capture device is worthy of attention. Therefore, according to the number of alarm messages for each capture device, the weight corresponding to each capture device is determined. The greater the number of alarm messages for a capture device is, the greater the weight corresponding to the capture device is. The play duration corresponding to each capture device is determined according to the weights. The greater the weight corresponding to a capture device is, the longer the duration for the capture device is. The play time period for each capture device is determined according to the determined play durations. The management device controls the video wall to perform video patrol according to the determined play time period for each capture device. It can be seen that with this solution, the video captured by the capture device that is worthy of attention is played on the video wall for a longer duration, thereby paying close attention to key areas.

An embodiment of the present application further provides an executable program code for performing the above video patrol method when being executed. The method includes:

determining a weight corresponding to each capture device managed by the management device according to the number of alarm messages for each capture device stored in a database, wherein the larger the number of alarm messages for a capture device is, the greater a weight corresponding to the capture device is;

determining, according to the weights, a play duration corresponding to each capture device, wherein the greater a weight corresponding to a capture device is, the longer a play duration of the capture device is; and determining, according to the determined play durations, a play time period for each capture device.

In the embodiment in the present application, the number of alarm messages for each capture device is stored in the database. The greater the number of alarm messages for a capture device is, the more this capture device is worthy of attention. Therefore, according to the number of alarm messages for each capture device, the weight corresponding to each capture device is determined. The greater the number of alarm messages for a capture device is, the greater the weight corresponding to the capture device is. The play duration corresponding to each capture device is determined according to the weights. The greater the weight corresponding to a capture device is, the longer the duration for the capture device is. The play time period for each capture device is determined according to the determined play durations. The management device controls the video wall to perform video patrol according to the determined play time period for each capture device. It can be seen that with this solution, the video captured by the capture device that is worthy of attention is played on the video wall for a longer duration, thereby paying close attention to key areas.

An embodiment of the present application further provides a storage medium for storing an executable program code. The executable program code performs the above video patrol method when being executed. The method includes:

determining a weight corresponding to each capture device managed by the management device according to the number of alarm messages for each capture device stored in a database, wherein the larger the number of alarm messages for a capture device is, the greater a weight corresponding to the capture device is;

determining, according to the weights, a play duration corresponding to each capture device, wherein the greater a weight corresponding to a capture device is, the longer a play duration of the capture device is; and determining, according to the determined play durations, a play time period for each capture device.

In the embodiment in the present application, the number of alarm messages for each capture device is stored in the database. The greater the number of alarm messages for a capture device is, the more this capture device is worthy of attention. Therefore, according to the number of alarm messages for each capture device, the weight corresponding to each capture device is determined. The greater the number of alarm messages for a capture device is, the greater the weight corresponding to the capture device is. The play duration corresponding to each capture device is determined according to the weights. The greater the weight corresponding to a capture device is, the longer the duration for the capture device is. The play time period for each capture device is determined according to the determined play durations. The management device controls the video wall to perform video patrol according to the determined play time period for each capture device. It can be seen that with this solution, the video captured by the capture device that is worthy of attention is played on the video wall for a longer duration, thereby paying close attention to key areas.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise (s) a/an . . . " and "include(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiments of the apparatus, the electronic device, the executable program code and storage medium is described briefly, since it is substantially similar to the embodiment of the method, and the related contents can refer to the description of the embodiment of the method.

It can be understood by a person skilled in the art that all or a part of steps in the implementations of the above method can be accomplished by instructing related hardware through programs, which can be stored in a computer-readable storage medium, such as in ROM/RAM, a disk, an optical disk, and so on.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A video patrol method, which is applicable to a management device in a video patrol system, comprising:
determining, by the management device, a weight corresponding to each capture device managed by the management device according to a number of alarm messages for each capture device stored in a database, wherein larger the number of alarm messages for a capture device is, greater the weight corresponding to the capture device is;
determining, by the management device, according to the determined weights, a play duration corresponding to each capture device, wherein the greater the weight corresponding to the capture device is, longer a play duration of the capture device is;
determining, by the management device, a target moment corresponding to each capture device according to a first identifier of a capture device and an alarm moment corresponding to each alarm message stored in the database; and
determining, by the management device, a play time period for each capture device according to the play duration and the target moment corresponding to the each capture device;
wherein, the database further stores a number of alarm messages for each preset point of each capture device;
determining, by the management device, the weight corresponding to the each capture device managed by the management device comprises:
determining, by the management device, a weight corresponding to each preset point of the each capture device managed by the management device;
determining, by the management device, according to the determined weights, the play duration corresponding to each capture device comprises:
determining, by the management device, according to the weight corresponding to each preset point, the play duration corresponding to each preset point; and
the video patrol method further comprises:
determining, by the management device, according to the play duration corresponding to each preset point, a play time period for each preset point;
receiving, by the management device, a first switching instruction, wherein the first switching instruction contains a first identifier of a to-be-switched capture device and a second identifier of a to-be-switched preset point of the to-be-switched capture device; and
sending, by the management device, according to the first identifier of the to-be-switched capture device, a second switching instruction to the to-be-switched capture device, wherein the second switching instruction contains the second identifier of the to-be-switched preset point, so that the to-be-switched capture device switches a current preset point thereof to the to-be-switched preset point.

2. The video patrol method according to claim 1, wherein storing the number of alarm messages for a capture device in the database comprises:
receiving, by the management device, an alarm message, and determining a target area in which the alarm message is located; and
determining, by the management device, a target capture device in the target area, and updating the number of alarm messages for the target capture device in the database.

3. The video patrol method according to claim 1, wherein, storing a first identifier of a capture device and the alarm moment corresponding to the alarm message in the database comprises:
receiving, by the management device, an alarm message, and determining a target area in which the alarm message is located and the alarm moment corresponding to the alarm message; and
determining, by the management device, a target capture device in the target area, and storing the alarm moment corresponding to the alarm message and the first identifier of the target capture device in the database.

4. The video patrol method according to claim 3, wherein, determining a target area in which the alarm message is located comprises:
determining, by the management device, a location of the alarm message in a map; and
determining, by the management device, a target area in which the location is located according to pre-divided areas in the map.

5. The video patrol method according to claim 4, wherein, the map is an electronic map being displayed, and the video patrol method further comprises:
determining, by the management device, a first capture device corresponding to a video being played;
determining, by the management device, a first location of the first capture device in the map; and
increasing, by the management device, a display brightness of the first location, or making a mark on the first location and displaying the mark.

6. The video patrol method according to claim 1, further comprising:
receiving, by the management device, a first patrol plan sent by a user, wherein the first patrol plan comprises the play time period for each capture device; and
controlling, by the management device, a video wall in the video patrol system to perform video patrol according to the first patrol plan.

7. An electronic device, comprising a processor, a communication interface, a memory, and a communication bus, wherein the processor, the communication interface, and the memory communicate with each other through the communication bus;
the memory is configured to store a computer program;
the processor is configured to perform, when executing the computer program stored in the memory, operations of:
determining a weight corresponding to each capture device managed by the management device according to a number of alarm messages for each capture device stored in a database, wherein larger the number of alarm messages for a capture device is, greater the weight corresponding to the capture device is;
determining, according to the determined weights, a play duration corresponding to each capture device, wherein the greater the weight corresponding to the capture device is, longer a play duration of the capture device is;

determining a target moment corresponding to each capture device according to a first identifier of a capture device and an alarm moment corresponding to each alarm message stored in the database; and determining a play time period for each capture device according to the play duration and the target moment corresponding to the each capture device;

wherein, the database further stores a number of alarm messages for each preset point of each capture device;

the processor is caused to perform operations of:

determining a weight corresponding to each preset point of the each capture device managed by the management device;

determining, according to the weight corresponding to each preset point, the play duration corresponding to each preset point; and determining, according to the play duration corresponding to each preset point, a play time period for each preset point;

wherein the processor is caused to perform operations of:

receiving a first switching instruction, wherein the first switching instruction contains a first identifier of a to-be-switched capture device and a second identifier of a to-be-switched preset point of the to-be-switched capture device; and sending, according to the first identifier of the to-be-switched capture device, a second switching instruction to the to-be-switched capture device, wherein the second switching instruction contains the second identifier of the to-be-switched preset point, so that the to-be-switched capture device switches a current preset point thereof to the to-be-switched preset point.

8. A non-transitory storage medium for storing an executable program code, wherein the executable program code performs the video patrol method according to claim 1 when being executed.

9. The electronic device according to claim 7, wherein the processor is caused to perform operations of:

receiving an alarm message, and determining a target area in which the alarm message is located; and determining a target capture device in the target area, and updating the number of alarm messages for the target capture device in the database.

10. The electronic device according to claim 7, wherein, the processor is caused to perform operations of:

receiving an alarm message, and determining a target area in which the alarm message is located and the alarm moment corresponding to the alarm message; and determining a target capture device in the target area, and storing the alarm moment corresponding to the alarm message and the first identifier of the target capture device in the database.

11. The electronic device according to claim 10, wherein the processor is caused to perform operations of:

determining a location of the alarm message in a map; and determining a target area in which the location is located according to pre-divided areas in the map.

12. The electronic device according to claim 11, wherein, the map is an electronic map being displayed, and the processor is caused to perform operations of:

determining a first capture device corresponding to a video being played;

determining a first location of the first capture device in the map; and increasing a display brightness of the first location, or making a mark on the first location and displaying the mark.

13. The electronic device according to claim 7, wherein the processor is caused to perform operations of:

receiving a first patrol plan sent by a user, wherein the first patrol plan comprises the play time period for each capture device; and controlling a video wall in a video patrol system to perform video patrol according to the first patrol plan.

* * * * *